March 16, 1937. H. C. GRANT, JR 2,074,262
SUPERVISED ELECTRIC ALARM SYSTEM
Filed Sept. 22, 1934
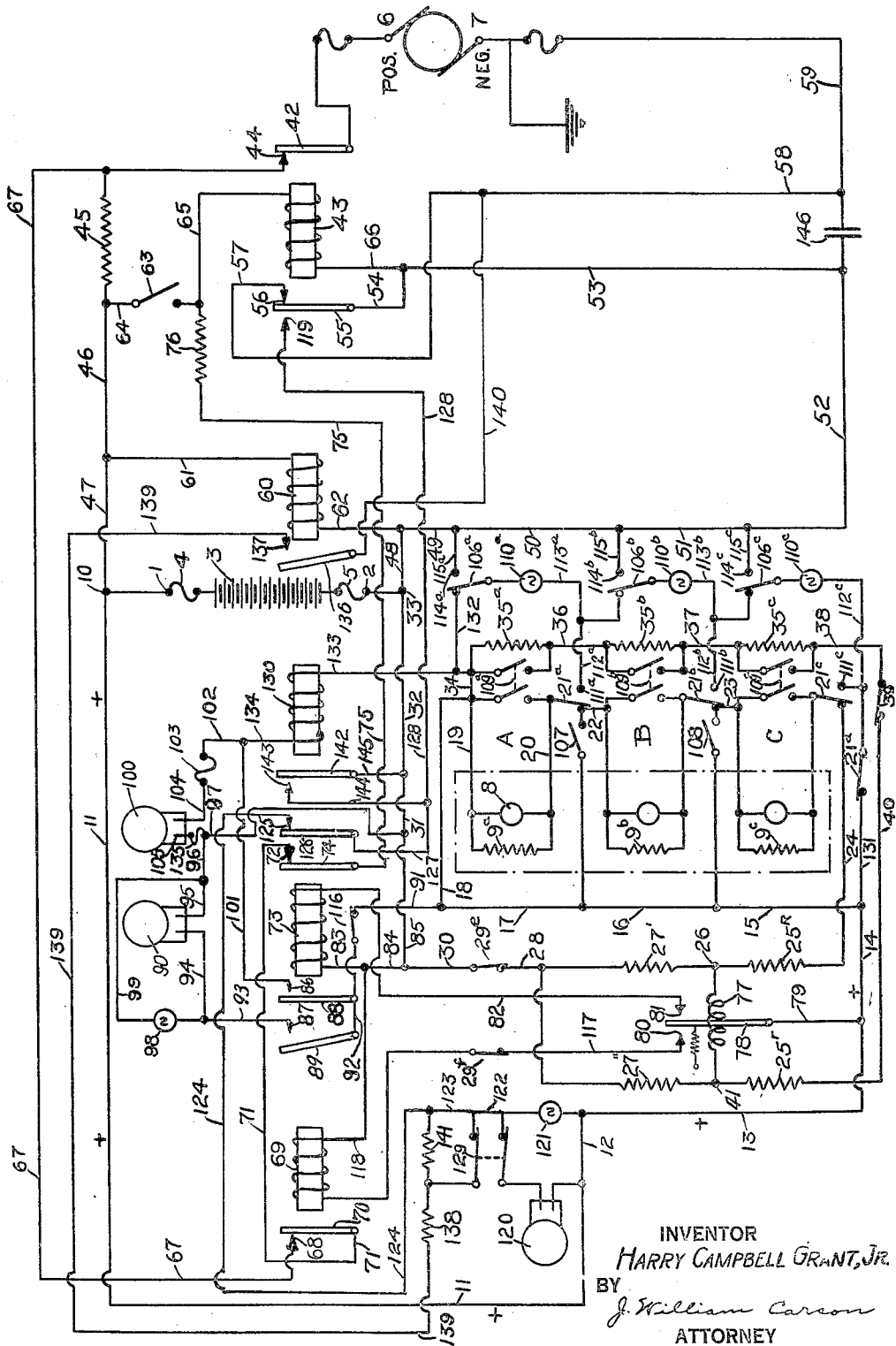
INVENTOR
*Harry Campbell Grant, Jr.*
BY
*J. William Carson*
ATTORNEY Patented Mar. 16, 1937

2,074,262

UNITED STATES PATENT OFFICE 2,074,262

SUPERVISED ELECTRIC ALARM SYSTEM

Harry Campbell Grant, Jr., New York, N. Y., assignor to Walter Kidde & Company, Inc., Bloomfield, N. J., a corporation of New York Application September 22, 1934, Serial No. 745,093

5 Claims. (Cl. 177—355)

This invention relates to alarm systems, for fire, for burglary, and so forth, of the type in which a plurality of external circuits, each comprising a pair of parallel wires bridged by one or more normally open circuit closing devices, each arranged to short-circuit a current limiting resistance in the circuit, are connected in series with each other and with a source of electric potential, whereby the closing of any one of the circuit closing devices, due to a fire condition or burglary, is indicated at a central alarm station.

Previous systems of the type in which each external circuit comprises a pair of parallel wires bridged by one or more normally open circuit closing devices, each designed to short-circuit a current limiting resistance in the circuit, have been objectionable because of the need for an alarm relay for each of the several external circuits. Another objection to previous systems has been incomplete supervision against various kinds of trouble which may be encountered under conditions of actual service.

It is therefore the primary object of the present invention to provide a fire alarm system of the type referred to which will meet the public demand for a simple and efficient system, and which at the same time is fully supervised against any troubles which may develop.

It is also an object of this invention to provide a system which can be electrically energized by a secondary source of electrical potential normally under charge from a main source of electrical potential.

It is also an object of this invention to indicate failure of the main source of electrical energy.

It is a further object to indicate failure of the secondary source of electrical energy.

It is a still further object to supervise the external circuits against grounds and to provide means to remove the grounds so as to avoid dangerous conditions which would otherwise occur.

Further objects, not specifically enumerated above, will be apparent as the invention is described in greater detail in connection with the accompanying drawing, in which the single figure is a diagrammatical representation of an alarm system constructed and arranged in accordance with the invention.

In the system shown the reference numerals 1 and 2 represent the positive and negative terminals of a secondary source of electrical potential in the form of a battery 3, which is protected by fuses 4 and 5 and which is normally under charge, in a manner hereinafter to be described, from a main source of electrical energy, the positive and negative terminals of which are shown at 6 and 7.

The reference character A represents a so-called "external" circuit containing one or more normally open circuit closing thermostats or other circuit closing devices 8, the latter being arranged to short-circuit when operated a current limiting end resistance $9^a$. B and C represent additional external circuits, all of which are connected in series with a Wheatstone bridge arrangement in the following manner; current flowing from the positive line beginning at the junction point 10, through the wires 11 through 18 inclusive, one side, 19, of the external circuit A, the end resistance $9^a$, the other side, 20, of the external circuit A, switch $21^a$, wire 22, the external circuit B, switch $21^b$, wire 23, the external circuit C, switch $21^c$, wire 24, resistance $25^R$, junction point 26, resistance 27', wire 28, switch $29^e$, and wires 30, 85, 31 and 32 to the junction point 33 on the negative line. In fact, the circuit just described constitutes one entire side of the Wheatstone bridge circuit. The other side of the Wheatstone bridge circuit begins also at the junction point 10 on the positive line and continues through the wires 11 through 18 inclusive, the wire 34, a resistance $35^a$ equal in ohmic value to the end resistance $9^a$, wire 36, resistance $35^b$, wire 37, resistance $35^c$, wire 38, switch 39, wire 40, resistance $25^r$, junction point 41, resistance 27'', wire 28, switch $29^e$, and wires 30, 85, 31 and 32 to the junction point 33 on the negative line.

The circuits just described and the battery 3 are connected in parallel with the main supply terminals 6 and 7, the latter normally supplying the energizing current for said circuit and the charging current for the battery, the positive and negative junction points being at 10 and 33.

The path of the charging current for the battery is from the main supply terminal 6 through the armature 42 of the main supply supervising relay 43, the contact 44, the charging resistance 45, the wires 46 and 47, through the battery, the wires 48 through 54 inclusive, the armature 55, the contact 56, and the wires 57, 58 and 59 to the main supply terminal 7.

At 60 is shown the battery supervising relay which is connected to the positive terminal of the battery by wires 47 and 61, and to the negative terminals of the battery by the wires 62 and 48.

When a system in accordance with the present invention has been installed and is to be made ready for use, the reset switch 63 is closed, whereupon current flows from the positive terminal of the battery through the wires 47, 46 and 64, the reset switch 63, the wire 65, the main supply supervising relay 43, and the wires 66, 53, 52, 51, 50, 49 and 48 to the negative terminal of the battery. This results in energization of the main supply supervising relay 43, causing closing of the contacts 44 and 56. Upon intentional reopening of the reset switch 63, which is therefore preferably of the push-button type, the main supply supervising relay 43 will be found to be connected across the main supply terminals 6 and 7 through the armature 42, the contact 44, the wire 67, the contact 68 of the trouble relay 69, the armature 70, the wire 71, the contact 72 of the fire alarm relay 73, the armature 74, the wire 75, the resistance 76, the wires 65, 66 and 54, the armature 55, the contact 56, and the wires 57, 58 and 59, thus holding the relay 43 energized.

At 77 is shown the coil of a galvanometer relay which is connected between the junction points 41 and 26 of the Wheatstone bridge arrangement; the galvanometer arm 78 being connected by a wire 79 to the positive line, as shown. The galvanometer arm 78 is arranged to close the contact 80 to the trouble relay 69 for no-current conditions, so that the galvanometer may supervise itself against derangement, failure of the galvanometer coil 77 allowing the contact 80 to the trouble relay 69 to close. For normal supervisory conditions it is necessary that the galvanometer arm 78 float; and in order to obtain this condition, the resistances $25^r$ and $25^R$ in the opposite sides of the bridge circuit are made unequal and of such relative values as to cause the galvanometer arm to be midway between the two contacts 80 and 81, the latter of which leads to the fire alarm relay 73.

At the time of a fire on any one of the external circuits, the end resistance of such circuit is shunted out or short-circuited by operation of a thermostat 8. This unbalancing of the bridge circuit causes the galvanometer contact 81 to close, establishing a circuit through the fire alarm relay 73, current flowing from the positive line through wires 11, 12, 13 and 79, galvanometer arm 78, contact 81, wire 82, fire alarm relay 73, and wires 83, 84, 85, 31 and 32 to the negative line. This results in the closing of the contacts 86 and 87 by the armatures 88 and 89, whereupon fire alarm signals are rendered in the following manner. The reference numeral 90 represents the fire alarm gong which is normally located at the central fire alarm station. This gong is sounded by reason of current flowing from the positive line through the wires 11 through 17 inclusive, wire 91, switch 116, wire 92, armature 89, contact 87, wires 93 and 94, the fire alarm gong 90, and wires 95, 96, 97, 31 and 32 to the negative line at 33. At the same time the fire alarm lamp 98, normally located at the central fire alarm station, is illuminated by current flowing from the positive line through the wires 11 through 17 inclusive, wire 91, switch 116, wire 92, armature 89, contact 87, wire 93, the fire alarm lamp 98, and wires 99, 96, 97, 31 and 32 to the negative line at 33.

In certain types of installations, for example on board ships, it is advisable to signal the presence of fire to the engine room or some other location than the central fire alarm station, which is normally in the wheelhouse or chart room of the ship. For this purpose there is provided a second fire alarm gong 100, which becomes energized by current flowing from the positive line through the wires 11 through 17 inclusive, wire 91, switch 116, armature 88, contact 86, wires 101 and 102, fuse 103, wires 104 and 105, fuse 135, and wires 97, 31 and 32 to the negative line.

As soon as the presence of fire is made known by any one or more of the means provided, the fire-watch attendant immediately proceeds to the central fire alarm station, at which point he will find on the operating panel the already referred to switches $21^a$, $21^b$, $21^c$, $29^e$ and 39. He will also find the switches $21^d$, $29^f$, $106^a$, $106^b$, $106^c$, 107, 108, $109^a$, $109^b$ and $109^c$. Of these switches, the fire-watch attendant operates all but the switches $109^a$, $109^b$ and $109^c$. This operation isolates each external circuit and connects positive potential to them on one side of the end resistance. The other side of the end resistance in each case connects to an associated fire alarm circuit lamp $110^a$, $110^b$ or $110^c$.

If no fire has occurred in any of the spaces protected by the circuit A, for example, a circuit is established from the positive line through the wires 11 through 18 inclusive, the external circuit A and its end resistance $9^a$, switch $21^a$ across to contact $111^a$, wire $112^a$, wire $113^a$, circuit lamp $110^a$, switch $106^a$ across to contact $114^a$, and wires $115^a$, 49 and 48 to the negative line, but due to the end resistance $9^a$, the current is insufficient to illuminate the lamp. If, however, fire has occurred in one of the spaces protected by the external circuit A, so that one of the thermostats 8 has operated to shunt out or short-circuit the end resistance $9^a$, the circuit lamp $110^a$ will light and indicate that circuit A is in alarm.

Similar indications are given in connection with the external circuits B and C, as can be readily understood from the drawing, the corresponding switches and lamps being indicated by similar reference numerals.

It should be noted that as a practical matter, since all of the switches on the control panel at the central station which are to be operated by the fire-watch attendant at the same time, the switches might well be arranged to be operated simultaneously by any suitable mechanism. In fact, as it is customary to locate the central station apparatus in a control cabinet, it can be easily arranged to have all the switches operated automatically upon the opening of the control cabinet door.

Reference might be made at this time to the normally closed switch 116, which will be found in the positive connection 91 of the fire alarm signals. This switch is located on the operating panel at the central control station, and may be opened by the fire-watch attendant upon the occurrence of fire so as to silence the fire alarm gongs 90 and 100 and to darken the fire alarm lamp 98, while at the same time a circuit lamp remains illuminated to indicate the occurrence of a fire. This switch is preferably arranged to open automatically upon opening of the door of the control cabinet in which the central station apparatus is usually housed, so that any attempt to close the door without heeding the fire alarm will cause the fire signal to be repeated.

In the case of a broken wire in any portion of the supervisory circuit, the Wheatstone bridge is unbalanced in the opposite sense to that which occurs when a thermostat operates, causing the galvanometer contact 80 on the trouble side of the bridge to close and to establish a circuit through the trouble relay 69, current flowing from the positive line through wires 11, 12, 13 and 79, galvanometer arm 78, contact 80, wire 117, switch 29ʳ, trouble relay 69, and wires 118, 84, 85, 31 and 32 to the negative line. This results in the opening of the contact 68 by the armature 70, which action directly interrupts the already described energizing circuit of the main supply supervising relay 43, whereupon the latter is deenergized, opening the contact at 56 and closing the contact at 119. This action in turn results in the sounding of the trouble gong 120 and the illumination of the trouble lamp 121, by reason of current flowing from the positive terminal of the battery through the wire 11, then in parallel through the trouble gong 120 and the trouble lamp 121, then through wires 122, 123 and 124, contact 125, armature 126 of the fire alarm relay 73, wires 127 and 128, contact 119, armature 55, and wires 54, 53, 52, 51, 50, 49 and 48 to the negative terminal of the battery. The sounding of the trouble gong 120 can be stopped by opening the normally closed switch 129, but the trouble lamp 121 will remain illuminated until the trouble has been repaired.

In order to locate the external circuit on which a wire-break has occurred, the previously referred to switches which have been operated by the fire-watch attendant or by the opening of the door of the central station control cabinet, must be closed so as to reestablish the normal supervisory circuit, the wire-break of course reinstating the trouble signals. Each of the switches 109ᵃ, 109ᵇ and 109ᶜ, which are manually operable, is momentarily closed in turn until the switch is reached which causes the trouble signals to cease. This switch will correspond to the circuit in which the broken wire exists. This switch may then be locked down so as to shunt out the associated external circuit and the associated balancing resistance 35ᵃ, 35ᵇ or 35ᶜ, thereby reestablishing a balanced condition in the Wheatstone bridge circuit and allowing subsequent fire or trouble signals for any other external circuit.

It has already been mentioned that the external circuits are protected against the occurrence of grounds, it being noted that it is customary in ship installations to have the ship's electrical circuits ground clear, although this condition rarely exists. At times the ship's negative may be grounded and shortly after this the ground may be changed from negative to positive. The relative position of the ground on a ship's generator and various points of the circuit of the present invention will cause different indications to be given at the central control station.

In order to clarify the discussions which follow, let it be assumed, by way of example, that a ship has a 220 volt supply and that the battery 3 of the present invention is a 40 volt battery.

If, therefore, a ground exists anywhere in an external circuit, regardless of whether the positive side or negative side of the main supply is normally grounded, the galvanometer arm 78 will deflect either right or left, causing in turn operation of either the fire alarm relay 73 or the trouble relay 69 in the manner already described. Operation of either of the relays 73 or 69 in turn causes the release of the main supply relay 43, the normally closed contact 68 of the trouble relay 69 and the normally closed contact 72 of the fire alarm relay 73 both being in the already described energizing circuit of the main supply relay 43. Of course, release of the main supply relay 43 opens the contacts at 44 and 56, disconnecting the fire alarm system from the main supply, clearing the ground circuit and protecting the resistances and the galvanometer of the fire alarm system from damage.

It will be noted that release of the main supply relay upon operation of the trouble relay 69 for any cause results in trouble signals being instituted through the contact 119 of the main supply relay 43. While it is desirable to have a similar indication upon operation of the fire alarm relay 73 due to the occurrence of a ground, it is not desirable to have a trouble signal given upon operation of the fire alarm relay 73 due to fire, as the fire-watch attendant might look for trouble before he looks for a fire. Therefore the already referred to normally closed contact 125 is arranged to open the circuit to the trouble gong 120 and the trouble lamp 121 whenever the fire alarm relay 73 is operated, the contact 125 being opened by picking up of the armature 126.

Although it is one of the purposes of the main supply supervising relay 43 to indicate the failure of the main supply, whereby the relay would be de-energized and the trouble signals given in the manner already explained, the most important function of the relay 43 is to break the circuit between the fire alarm system and the main supply on both sides, thus removing the ground and restoring the normal supervising condition of the system, so that dangerous currents often flowing for ground conditions will be interrupted. For this reason the relay 43 is not arranged to pick up on the main supply voltage directly, but, if de-energized, is required to be reset manually by the reset switch 63, as otherwise, upon deenergization of the relay 43 due to a ground with consequent breaking of the ground circuit, the relay 43 would be reenergized and thus bring back the ground, with the result that the relay would buzz rapidly and burn off either of the contacts 44 or 56, depending on the relative location of the grounded points.

The relay 43 has also a third function, which is best mentioned at this time, in that the breaking of the circuit between the fire alarm system and the main supply upon failure of the main supply prevents the battery from discharging back into the main supply lines, the battery now serving as the main and only source of energy.

It is to be understood that the detection of grounds in accordance with the present invention depends upon normal grounding of the positive or negative of the main source of electrical supply, either directly or through a ground resistance of a ground detector arrangement such as is sometimes employed, and which consists of two lamps connected in series with each other and across the main supply, the connection between the lamps being normally grounded, so that each of the lamps is a referred to ground resistance, and whereby grounding of either line at any point gives a ground signal by causing the extinguishing of the corresponding lamp and the brightening of the lamp corresponding to the other line.

In view of the fact that the auxiliary fire alarm gong 100 is normally located at some distance from the central fire alarm station, defects can easily occur in the external leads to the auxiliary fire alarm gong, and this gong is accordingly supervised by means of the auxiliary gong supervising relay 130, current flowing from the positive line through the wires 11 through 14 inclusive, wire 131, switch 21$^d$, wire 112$^c$, circuit lamp 110$^c$, switch 106$^c$, wire 113$^b$, circuit lamp 110$^b$, switch 106$^b$, wire 113$^a$, circuit lamp 110$^a$, switch 106$^a$, wires 132, 133, 134 and 102, fuse 103, the external gong lead 104, the auxiliary fire alarm gong 100, the external gong lead 105, fuse 135, and the wires 97, 31 and 32 to the negative line.

If now the main supply is normally grounded on the negative side, and if a ground occurs in the external gong lead 105, no indication will be given. If on the other hand a ground occurs in the external gong lead 104, nothing will happen until a fire signal is instituted, at which time the fuse 103 will blow out, cutting out the auxiliary gong 100, but permitting the fire alarm gong 90 to sound.

If, instead of the main supply line being normally grounded on the negative side, it is normally grounded on the positive side, a ground in the external gong lead 105 will blow out the fuse 135. However, due to the increased voltage across the auxiliary gong, its supervising relay 130 and the circuit lamps, the supervising relay will not release; while the auxiliary gong will operate upon institution of a fire signal. On the other hand, a ground in the external gong lead 104 will operate the auxiliary gong 100 at once, while the increased voltage across the supervising relay 130 and the circuit lamps may cause either the fuse 103 or a circuit lamp to blow. If this does not occur, the fuse 103 will blow upon the institution of a fire signal.

The external gong leads are not only protected against grounds in the manner already described, but likewise against direct short-circuits of the leads. Such a short-circuit is normally undetected, but as soon as a fire alarm signal is given, the short-circuit of the auxiliary gong leads constitutes a direct short-circuit of the battery, whereupon the fuse 103 or the fuse 135 will be blown out, the fuses 103 and 135 being of a lower rating than the battery protecting fuses 4 and 5, so that they will blow out in preference to the fuses 4 and 5, leaving the remainder of the system still connected to the battery and ready for any other operation.

While the main supply supervising relay 43 is normally energized, the battery supervising relay 60, which is connected across the terminals of the battery 3, is not energized by the normal battery voltage, but is designed to energize upon a considerable increase in voltage across the relay winding.

It has already been explained that the external circuit between the junction points 10 and 33, and the battery 3, are connected in parallel across the main supply terminals 6 and 7. so that normally the main supply terminals provide the supervisory current flowing through the external circuit and the charging current flowing into the battery. When, however, a fire alarm or trouble alarm is given, the increased current required by the alarm gongs is greater than can be supplied by the main supply. The charging current normally flowing into the battery therefore reverses itself and the battery supplies the excess current required when alarm conditions arise.

If now the battery should fail for any reason, the battery supervising relay 60 will be energized and give the trouble signals.

The battery supervising relay 60 is energized upon failure of the battery, both when the system is in its otherwise normal condition and when fire alarm or trouble alarm conditions exist. The manner in which the battery supervising relay is thus energized will be better understood if it is kept in mind that the voltage across the relay winding is normally the same as the voltage across the battery and across the external circuit between the junctions 10 and 33. In the system herein described, the resistance of the external circuit is considerably greater than the internal resistance of the battery, and is also somewhat greater than the value of the charging resistance 45. It also happens that in the system described the internal resistance of the battery is less than the value of the charging resistance 45. When, therefore, the battery fails for any reason with the substitution of practically infinite resistance in place of the normally small internal resistance of the battery, a considerably increased voltage drop will occur across the external circuit, due to the fact that removal of the battery charging current load will reduce the voltage drop across the charging resistance 29—30, and this increased voltage, occurring likewise across the winding of the relay 60, will cause the relay to pick up its armature 136 and close the contact at 137. The trouble signals will then be given by reason of current flowing from the positive line through the trouble gong and the trouble lamp in parallel, the wire 122, one side of the switch 129, the resistance 138, the wire 139, the contact 137, the armature 136, and the wires 140, 58 and 59 to the main supply terminal 7. If now the trouble gong be stopped by opening the switch 129, additional resistance must be drawn into the circuit to protect the trouble lamp 121, and this additional resistance will be found at 141, so that the trouble lamp is energized in a series circuit including the resistances 138 and 141.

It should be noted that the supervisory circuit for the auxiliary gong 100 also includes the circuit lamps, as already hereinabove described, so that failure of the auxiliary gong, or of any one of the circuit lamps, or even of the auxiliary gong supervising relay 130 itself, causes the relay 130 to release its armature 142 and close the contact 143, whereby the trouble gong 120 and the trouble lamp 121 will be operated by reason of current flowing from the positive line through the trouble gong and trouble lamp in parallel, the wires 122, 123 and 124, the contact 125, the armature 126, the wires 127 and 144, the contact 143, the armature 142, and the wires 145 and 32 to the negative line.

It should also be noted that operation of the fire alarm relay 73 acts to short-circuit the auxiliary gong supervising relay 130, causing it to release, but no undesired trouble signal is then given because the trouble signal circuit is opened by the already described contact 125 of the fire alarm relay 73.

In view of the fact that operation of the various external circuit isolating switches at the time a fire signal is given includes the opening of the switch 21$^d$ in the external circuit connection to the one side of the Wheatstone bridge arrangement, an undesired wire-break trouble signal would be given. This undesired signal is avoided by completely isolating the Wheatstone bridge arrangement, the switch 39 opening the associated resistance connection to the other side of the Wheatstone bridge, the switch 29$^e$ interrupting the negative line connection to the bridge, and the switch 29$^f$ interrupting the connection to the trouble relay 69.

It will of course be understood that the fire alarm relay 73 and the trouble relay 69 are used since the contacts of the galvanometer relay are not heavy enough to operate the fire alarm and trouble alarm signals directly.

In connection with the resistance 76, it should be noted that this is a current limiting resistance. Also, in connection with the condenser 146, this condenser is employed to prevent arcing at the contact 56 of the main supply supervising relay 43.

It will be understood that circuit lamps have been referred to by way of example only, it being possible to employ annunciator type relays in their place, or any other suitable electro-responsive indicator.

It will also be understood that the polarities of certain portions at least of the herein described system and circuits can be reversed without affecting either the principle of the invention or the practicability of operation of the system.

From the foregoing description it will be apparent that I have made various improvements in supervised electric alarm systems of the general type referred to, but while the invention has been described with specific reference to the accompanying drawing, it is not to be understood as limited, save as defined in the appended claims.

What is claimed is:

1. A supervised electric alarm system of the type comprising a plurality of external circuits arranged in series with each other and with a source of electric potential, each external circuit including an end resistance at the outermost end thereof, said end resistance being bridged by at least one normally open circuit-closing device, electro-responsive signaling means, means to connect said electro-responsive signalling means so as to be operable upon an increase in current flow in the series connected external circuits, whereby closing of a circuit-closing device of a particular external circuit short-circuits the end resistance of that particular circuit, causing an increased current flow therein with accompanying actuation of the electro-responsive signaling means, a plurality of electro-responsive indicating means arranged in series with each other and energized from the source of electric potential, there being an electro-responsive indicating means for each external circuit, means to interrupt the series connections between the respective external circuits, means to interrupt the energizing circuit of the series of electro-responsive indicating means, means to interrupt the series connections between the respective electro-responsive indicating means, means to connect one side of each external circuit with one pole of the source of electric potential, means to connect the other side of each external circuit with one side of its associated electro-responsive indicating means, and means to connect the opposite side of each electro-responsive indicating means with the opposite pole of the source of electric potential, whereby when a circuit-closing device on a particular circuit has operated to short-circuit the end resistance of that circuit and the aforesaid circuit interrupting and connecting means have been actuated, the electro-responsive indicating means of said particular circuit will be actuated.

2. A supervised electric alarm system of the type comprising a plurality of external circuits arranged in series with each other and with a source of electric potential, each external circuit including an end resistance at the outermost end thereof, said end resistance being bridged by at least one normally open circuit-closing device, main electro-responsive signaling means, means to connect said main electro-responsive signaling means so as to be operable upon an increase in current flow in the series connected external circuits, whereby closing of a circuit-closing device of a particular external circuit short-circuits the end resistance of that particular circuit, causing an increased current flow therein with accompanying actuation of the main electro-responsive signaling means, electro-responsive trouble signaling means, means to connect said electro-responsive trouble signaling means so as to be operable upon a decrease in current flow in the series connected external circuits, whereby interruption of the series circuit through the external circuits will effect actuation of the electro-responsive trouble signaling means, a plurality of electro-responsive indicating means arranged in series with each other and energized from the source of electric potential, there being an electro-responsive indicating means for each external circuit, means to interrupt the series connections between the respective external circuits, means to interrupt the energizing circuit of the series of electro-responsive indicating means, means to interrupt the series connections between the respective electro-responsive indicating means, means to connect one side of each external circuit with one pole of the source of electric potential, means to connect the other side of each external circuit with one side of its associated electro-responsive indicating means, means to connect the opposite side of each electro-responsive indicating means with the opposite pole of the source of electric potential, whereby when a circuit-closing device on a particular circuit has operated to short-circuit the end resistance of that circuit and the aforesaid circuit interrupting and connecting means have been actuated, the electro-responsive indicating means of said particular circuit will be actuated; and means to prevent a false trouble alarm upon interruption of the series connections between the respective external circuits comprising means operable to interrupt an energizing circuit of the electro-responsive trouble signaling means.

3. A supervised electric alarm system comprising a Wheatstone bridge arrangement, a source of electric potential for energizing the Wheatstone bridge arrangement, a plurality of external circuits arranged in series with each other and forming a portion at least of one arm of the Wheatstone bridge arrangement, each external circuit including an end resistance at the outermost end thereof, said end resistance being bridged by at least one normally open circuit-closing device, balancing resistance means equal in value to the sum of said end resistances and arranged in a series circuit forming a portion at least of the arm of the Wheatstone bridge arrangement paralleling the first mentioned arm, electro-responsive signaling means, means to connect said electro-responsive signaling means so as to be operable upon an increase in current flow in the series connected external circuits, whereby closing of a circuit-closing device of a particular external circuit short-circuits the end resistance of that particular circuit, causing an increased current flow in the associated arm of the Wheatstone bridge arrangement and consequent actuation of the electro-responsive signaling means, a plurality of electro-responsive indicating means arranged in series with each other and energized from the source of electric potential, there being an electro-responsive indicating means for each external circuit, means to interrupt the series connections between the respective external circuits, means to interrupt the energizing circuit of the series of electro-responsive indicating means, means to interrupt the series connections between the respective electro-responsive indicating means, means to connect one side of each external circuit with one pole of the source of electric potential, means to connect the other side of each external circuit with one side of its associated electro-responsive indicating means, means to connect the opposite side of each electro-responsive indicating means with the opposite pole of the source of electric potential, whereby when a circuit-closing device of a particular circuit has operated to short-circuit the end resistance of that circuit and the aforesaid circuit interrupting and connecting means have been operated, the electro-responsive indicating means of said particular circuit will be actuated; and means to isolate and thereby protect the Wheatstone bridge arrangement upon actuation of the aforesaid circuit interrupting and connecting means comprising means to disconnect the bridge from the series arrangement of the external circuits, from the series arrangement of the balancing resistance means, and from the remaining connection to one pole of the source of electric potential.

4. A supervised electric alarm system comprising a Wheatstone bridge arrangement, a source of electric potential for energizing the Wheatstone bridge arrangement, at least one pole of which source of electric potential may be normally grounded and from which source of electric potential a secondary source of electric potential for energizing the electric alarm system, in the event of failure of the first named source, is normally under charge, at least one external circuit forming a portion at least of one arm of the Wheatstone bridge arrangement, said external circuit including an end resistance at the outermost end thereof, said end resistance being bridged by at least one normally open circuit-closing device, balancing resistance means equal in value to said end resistance and arranged in a circuit forming a portion at least of the arm of the Wheatstone bridge arrangement paralleling the first mentioned arm, a pair of contacts controlled by the current measuring means of the Wheatstone bridge arrangement, a main alarm, a main alarm relay, means to control said main alarm relay by one of said contacts, a trouble alarm, a trouble alarm relay, means to control said trouble alarm relay by the other of said contacts, and means controlled by the main alarm relay and by the trouble alarm relay upon the occurrence of a ground in any one of the external circuit wires to effect disconnection of the electric alarm system from both poles of the first named source of electric potential together with disconnection from the normally existing ground, at the same time permitting the entire electric system to function from the secondary source of electric potential despite the disconnection of the first named source of electric potential and the existence of the accidental ground; the occurrence of a ground in said external circuit unbalancing the Wheatstone bridge and causing actuation of either the main alarm relay or the trouble alarm relay.

5. A supervised electric alarm system comprising a Wheatstone bridge arrangement, a source of electric potential for energizing the Wheatstone bridge arrangement, at least one pole of which source of electric potential may be normally grounded and from which source of electric potential a secondary source of electric potential for energizing the electric alarm system, in the event of failure of the first named source, is normally under charge, at least one external circuit forming a portion at least of one arm of the Wheatstone bridge arrangement, said external circuit including an end resistance at the outermost end thereof, said end resistance being bridged by at least one normally open circuit-closing device, balancing resistance means equal in value to said end resistance and arranged in a circuit forming a portion at least of the arm of the Wheatstone bridge arrangement paralleling the first mentioned arm, a pair of contacts controlled by the current measuring means of the Wheatstone bridge arrangement, a main alarm, a main alarm relay, means to control said main alarm relay by one of said contacts, a trouble alarm, a trouble alarm relay, means to control said trouble alarm relay by the other of said contacts, a normally closed contact controlled by each of the main alarm and the trouble alarm relays, a main supply relay, and two normally closed pairs of contacts controlled by the said main supply relay, said main supply relay being normally energized by reason of connection from one of the poles of the source of electric potential, through one of the pairs of contacts of the main supply relay, in series through the normally closed contacts controlled by the main alarm and trouble alarm relays, through the main supply relay, through the second pair of contacts of the main supply relay, to the other pole of the source of electric potential; whereby the occurrence of a ground in said external circuit will unbalance the Wheatstone bridge and actuate either the main alarm relay or the trouble alarm relay to open the normally closed contact controlled thereby, causing de-energization of the main supply relay and consequent disconnection of the electric alarm system from both poles of the first named source of electric potential together with disconnection from the normally existing ground, at the same time permitting the entire electric system to function from the secondary source of electric potential despite the disconnection of the first named source of electric potential and the existence of the accidental ground.

HARRY CAMPBELL GRANT, Jr.